April 3, 1951 C. A. GUSTAFSON 2,547,317
TRANSMISSION SHIFTING DEVICE
Filed Dec. 17, 1948
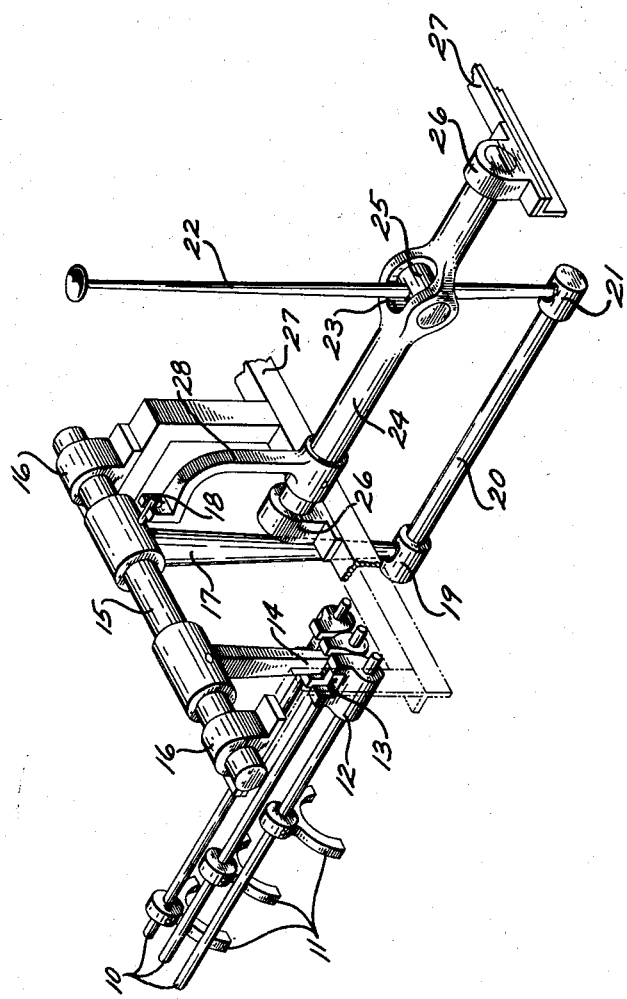
INVENTOR.
Carl A. Gustafson
BY Charles M. Fryer
ATTORNEY.

Patented Apr. 3, 1951

2,547,317

UNITED STATES PATENT OFFICE 2,547,317

TRANSMISSION SHIFTING DEVICE

Carl A. Gustafson, Peoria, Ill., assignor to Caterpillar Tractor Co., Peoria, Ill., a corporation of California Application December 17, 1948, Serial No. 65,841

1 Claim. (Cl. 74—473)

This invention relates to a mechanical control mechanism particularly adapted to shifting the gears in a vehicle transmission or the like from a remote position.

In an automotive type vehicle or the like, it is frequently desirable to locate the operator's station some distance away from the transmission and as a result, it is necessary to provide a satisfactory control mechanism for shifting the gears therein from a remote position. In large vehicles, the various levers used in conventional control mechanisms become so long that excessive bending or flexing is encountered making their use impractical.

It is therefore an object of this invention to provide a control mechanism of unusually simple design which permits the operator's station to be placed at any desired location without encountering excessive flexing of the control mechanism. Other objects and advantages of this invention will be made apparent in the following description wherein reference is made to the accompanying drawing.

The drawing is a schematic view of a control mechanism made in accordance with the present invention.

In the drawing, a plurality of shifter rails are shown at 10 and may be supported for sliding movement in a suitable transmission case or the like (not shown). A gear fork 11 is rigidly secured to each of the shifter rails and may be associated with gears (not shown) in a conventional manner to permit changes in the driving gear ratio. Each of the shifter rails carries a collar 12 which is provided with a suitable slot 13 for the reception of one end of an arm 14 carried on and rigidly secured to a shaft 15. The shaft 15 is carried for rotation, as well as axial sliding movement in a pair of bearings indicated at 16 which may be supported by the transmission case.

The collars 12 are so positioned on the shifter rails that when the transmission is in a neutral position, the slots 13 are aligned, permitting the arm 14 to be moved into engagement with any one of the collars upon sliding movement of the shaft 15. Sliding movement of the particular shifter rail selected and its associated gear is accomplished by rotating the shaft 15, causing the arm 14 to swing.

A second arm 17 is secured to the shaft 15 as by a pin 18 and at its extending end is connected by a universal joint 19 to one end of a link 20. At its opposite end, the link 20 is connected by a universal joint 21 to one end of a manually actuated control lever 22 which may be located within easy reach of the operator. The control lever 22 extends through a suitable opening 23 in a shaft 24 and is pivotally supported therein by means of a pin 25. The shaft 24 is supported for rotation in a pair of bearings 26 suitably supported as in a frame work 27 forming a part of the operator's platform. Adjacent one of its ends, the shaft 24 carries an arm 28, with a bifurcated end embracing the pin 18 on the arm 17.

The axis of rotation of the pin 25 carrying the control lever 22 is normal to the axis of rotation of the shaft 24 thus lateral movement of lever 22 causes the shaft 24 to rock about its own axis. Rocking of shaft 24 swings the arm 28 and causes sliding of the shaft 15 and arm 14. This permits selection of the particular shifter rail and associated gear to be shifted. Sliding of the shifter rails is accomplished by swinging movement of the control lever 22 about the axis of pin 25. This movement causes rocking of the shaft 15 through link 20 and arm 17 thus actuating the particular shifter rail with which the arm 14 is engaged.

The link 20, shaft 24 and shaft 15 may be made of any desired lengths depending upon the distance between the operator's station and the transmission housing and lengthening these parts in no way effects the operation of the associated mechanisms herein described. With this control mechanism, the longer members are subjected to either torsion loads or tension and compression loads thus minimizing the tendency of these elements to flex or bend during operation.

I claim:

In combination with a gear transmission adapted to be shifted through sliding and rocking movement of a single member, means for actuating said member from a remote position including a reciprocable link connected with said member to rock it, a rockable shaft connected with said member to reciprocate it, said shaft having an opening therethrough, a lever extending through said opening, a pivoted support for the lever transverse to and intersecting the axis of the shaft, and a connection between an end of the lever and said reciprocable link whereby the opposite end of the lever will be operable selectively to reciprocate said link or rock said shaft.

CARL A. GUSTAFSON.

REFERENCES CITED

The following references are of record in the file of this patent:

UNITED STATES PATENTS

| Number | Name | Date |
|---|---|---|
| 2,252,080 | Lapsley | Aug. 12, 1941 |
| 2,312,975 | Peterson et al. | Mar. 2, 1943 |

FOREIGN PATENTS

| Number | Country | Date |
|---|---|---|
| 90,812 | Austria | Jan. 10, 1923 |
| 342,718 | Great Britain | Feb. 4, 1931 |